US011671694B2

(12) United States Patent
Baker et al.

(10) Patent No.: US 11,671,694 B2
(45) Date of Patent: Jun. 6, 2023

(54) DEVICE FOR DETERMINING AN OPTICAL CHARACTERISTIC OF A CAMERA

(71) Applicant: Aptiv Technologies Limited, St. Michael (BB)

(72) Inventors: Brian Baker, Noblesville, IN (US); Mark Robert Vincen, Noblesville, IN (US); Dennis C. Nohns, Kokomo, IN (US)

(73) Assignee: Aptiv Technologies Limited, Si. Michael (BB)

( * ) Notice: Subject to any disclaimer, the term of this patent is extended or adjusted under 35 U.S.C. 154(b) by 295 days.

(21) Appl. No.: 17/203,666

(22) Filed: Mar. 16, 2021

(65) Prior Publication Data

US 2022/0303433 A1 Sep. 22, 2022

(51) Int. Cl.
*H04N 23/58* (2023.01)
*G01M 11/02* (2006.01)

(52) U.S. Cl.
CPC ........ *H04N 23/58* (2023.01); *G01M 11/0214* (2013.01)

(58) Field of Classification Search
CPC ............. G01M 11/0292; G01M 11/02; G01M 11/0221; G01B 11/06; G01B 21/08
See application file for complete search history.

(56) References Cited

U.S. PATENT DOCUMENTS

2020/0249119 A1 8/2020 Imrie

FOREIGN PATENT DOCUMENTS

DE 102015203704 7/2019

OTHER PUBLICATIONS

"Extended European Search Report", EP Application No. 22157998. 0, dated Aug. 3, 2022, 8 pages.
Bai et al., "MTF Measurement of IR Optics in Different Temperature Ranges", Oct. 6, 2017, 7 pages.
Balonek, "Innovative Test Method for Validating Image Quality Performance of Automotive Lenses over Operating Temperature Range", Sep. 4, 2020, 11 pages.

*Primary Examiner* — Dominic J Bologna
*Assistant Examiner* — Amanda Merlino
(74) *Attorney, Agent, or Firm* — Sawtooth Patent Group PLLC

(57) ABSTRACT

The techniques of this disclosure relate to determining an optical characteristic of a camera. The device includes a housing that receives a test fixture retaining a camera. The housing includes a first segment and a second segment creating a chamber surrounding the camera. The first segment is attached to the test fixture and defines a first orifice located in a side of the first segment. The first orifice directs a flow of a gas out of the chamber. The second segment defines a second orifice located in a first side of the second segment to direct the flow of the gas into the chamber. An aperture is located in a second side of the second segment and positioned opposite the test fixture to define a field of view that includes a camera target. The aperture receives a lens barrel of the camera and enables the determination of the optical characteristic.

20 Claims, 8 Drawing Sheets

DEVICE FOR DETERMINING AN OPTICAL CHARACTERISTIC OF A CAMERA

BACKGROUND

Cameras, especially wide-field cameras for advanced driver-assistance systems (ADAS), may be tested under extreme temperature and humidity environments. These extreme environments may not be suitable for delicate test instrumentation used to determine optical characteristics of the camera, for example, the instrumentation used for the determination of a modulation transfer function (MTF). Challenges are associated with testing cameras, particularly when testing at focal distances compatible with environmental test chambers where the environmental test chamber may not be sufficiently large to position test targets at distances required by the testing protocol. Environmental test chambers having transparent windows between the camera and the test targets can create optical aberrations, as the image may be affected by the optical properties of the window material.

SUMMARY

This document describes one or more aspects of a device for determining an optical characteristic of a camera. In one example, a device includes a housing configured to receive a test fixture that retains a camera for determining an optical characteristic of the camera. The housing includes a first segment and a second segment removably attached to the first segment, thereby creating a chamber into which the camera is disposed. The first segment is configured to attach to the test fixture and defines a first orifice located in a side of the first segment. The first orifice is configured to direct a flow of a gas out of the chamber. An inlet flow direction of the gas into the chamber is normal to an outlet flow direction of the gas out of the chamber. The second segment defines a second orifice located in a first side of the second segment to direct the flow of the gas into the chamber. An aperture located in a second side of the second segment is positioned opposite the test fixture to define a field of view that includes a camera target. The aperture is configured to receive a lens barrel of the camera, thereby enabling the determination of the optical characteristic.

In another example, a method includes adjusting, with a processor, a rotation angle of a test fixture about an optical axis of a camera retained by the test fixture. The test fixture and camera are disposed within a housing. The housing includes a first segment and a second segment removably attached to the first segment creating a chamber. The first segment is configured to attach to the test fixture and defines a first orifice located in a side of the first segment. The first orifice is configured to direct a flow of a gas out of the chamber. The second segment defines a second orifice located in a first side of the second segment to direct the flow of the gas into the chamber. The second segment also defines an aperture located in a second side of the second segment. The aperture is positioned opposite the test fixture to define a field of view that includes a camera target. The aperture is configured to receive a lens barrel of the camera, thereby enabling a determination of an optical characteristic of the camera. The method also includes receiving image data from the camera representing a captured image of the camera target in the field of view of the camera. The method also includes adjusting a position of the camera target in the field of view of the camera and determining the optical characteristic of the camera, based on the camera target, when a temperature of the camera is at a camera-temperature set point.

This summary is provided to introduce aspects of a device for determining an optical characteristic of a camera, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts, but also apply to other environments where cameras can be used to detect objects. This summary is not intended to identify essential features of the claimed subject matter, nor is it intended for use in determining the scope of the claimed subject matter.

BRIEF DESCRIPTION OF THE DRAWINGS

The details of one or more aspects of a device for determining an optical characteristic of a camera are described in this document with reference to the following drawings. The same numbers are used throughout the drawings to reference like features and components.

DETAILED DESCRIPTION

Overview

The techniques of this disclosure relate to a device for determining an optical characteristic of a camera. A modulation transfer function (MTF) is a measure of an image quality characteristic of the camera and is an industry-accepted metric for characterizing advanced driver-assistance systems (ADAS) cameras for automotive applications. The typical way to test the MTF characterization of a camera image includes sampling image data from several different positions or locations across a field of view of the camera.

ADAS cameras are expected to operate over a temperature range of −40° Celsius to 85° Celsius, and the performance is verified through laboratory testing using instrumentation that may not be rated to operate in the specified temperature range. The MTF testing can be accomplished at the specified temperature range by enclosing the camera in an environmental chamber that is mounted to a test stand specifically designed for MTF testing. The environmental chamber is capable of holding the camera at a predetermined temperature set-point while the MTF measurements are made at various points in the camera's field of view of. The environmental chamber receives conditioned air through an inlet orifice and circulates the air around the camera to transfer heat to or from the camera to achieve the camera temperature set-point. The conditioned air then exits from the environmental chamber and into the test cell. The environmental chamber has an aperture that exposes a lens of the camera to the test stand so that the camera can focus on a moveable target used for MTF testing across the entire field of view of the camera.

This disclosure introduces a device for determining an optical characteristic of a camera. Described is an environmental chamber for determining MTF measurements at all locations within the field of view of the camera. A method of determining the MTF using the environmental chamber is also disclosed. MTF measurements can be determined for any camera field position and indexed automatically to improve testing efficiencies, all while maintaining the camera at a desired temperature set-point.

Example Device

Figure 1:
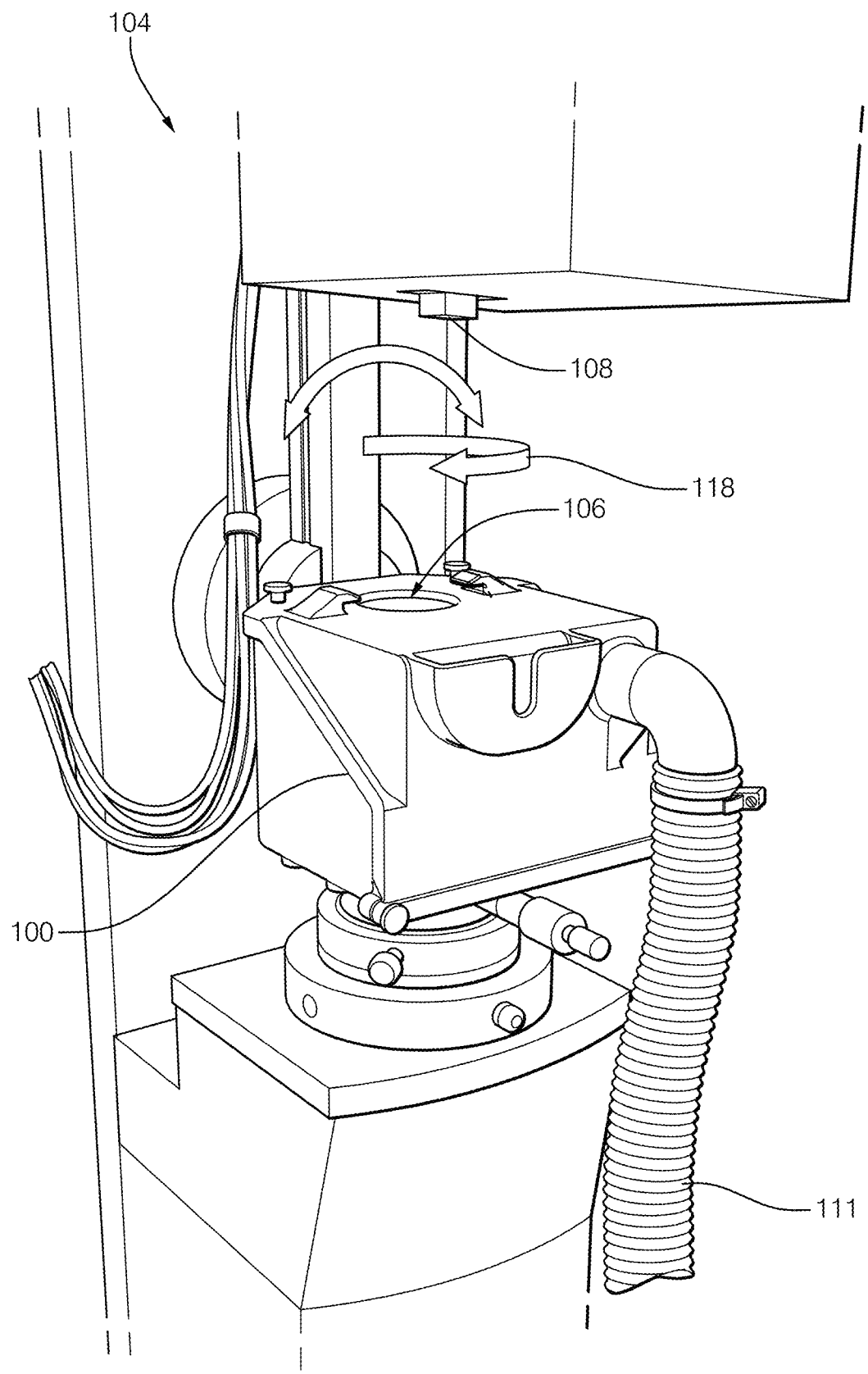
FIG. 1 illustrates an example device configured to determine an optical characteristic of a camera attached to a test stand.

FIG. 1 illustrates an example device 100 for determining an optical characteristic of a camera 102. One such characteristic is the MTF, which is a measure of an image quality of the camera 102, which will be explained in more detail below. In an example implementation, the device 100 is an environmental chamber placed on a test stand 104 designed to determine the MTF of the camera 102. In the examples disclosed herein, the test stand is a ProCam Test R&D test stand manufactured by TRIOPTICS GmbH, Wedel, Germany. It will be appreciated that the device 100 can be applied to other test stands used to measure optical characteristics of cameras. The camera 102 (see FIG. 3) can be located inside the environmental chamber with a view through an aperture 106 to a collimator 108 on the test stand 104 that houses a back-lit target 110. The collimator simulates target distances from about one meter (1 m) to infinity that can be experienced by the camera 102 in the field, and the target 110 is a cross-type reticle (see FIG. 2D) generated with collimated light to form a test image for the camera 102 to capture for analysis by the test equipment. The reticle image can be optically focused by the test equipment to simulate a desired physical distance of the test image in relation to the camera 102.

The environmental chamber can maintain a temperature of the environment to which the camera 102 is exposed and receives conditioned air from an air conditioning unit via a hose 111 attached to the device 100. The hose 111 can be insulated to reduce heat transfer between the hose and the environment to reduce the overshoot and undershoot temperature settings of the air conditioning unit. Cameras for automotive applications are required to function at temperatures ranging from −40 degrees Celsius (° C.) to 85° C., and in some applications up to temperatures of 125° C. The camera 102 may be any camera 102 suitable for use in automotive applications, for example, ADAS applications and/or occupant detection applications. The camera 102 includes optics that may include one or more fixed-focus lenses. The camera 102 includes an image sensor comprised of a two-dimensional array of pixels organized into rows and columns that define a resolution of the camera 102. The pixels may be comprised of a Charge Coupled Device (CCD) and/or a Complementary Metal Oxide Semiconductor (CMOS) that convert light into electrical energy based on an intensity of the light incident on the pixels.

Example Modulation Transfer Function (MTF)

In general, the MTF varies inversely with both a spatial frequency of the image features, and with the focused distance from an optical axis 116 or boresight of the camera 102. Typically, a larger MTF is considered a desirable feature of the camera 102. The MTF of the camera 102 is a measurement of the camera's 102 ability to transfer contrast at a particular resolution from the object to the image and enables the incorporation of resolution and contrast into a single metric. For example, as line spacing between two parallel lines or line pairs on a test target decreases (i.e., the spatial frequency increases), it becomes more difficult for the camera lens to efficiently transfer the change in contrast to an image sensor of the camera 102. In another example, for a test target having a given spacing between line pairs and imaged at two positions in a field of view 120 (FOV 120), the camera has more difficulty resolving the line pairs for the target imaged a distance away from the optical axis. As a result, the MTF decreases, or an area under a curve of a plot of the MTF decreases.

The MTF is a modulus or absolute value of an optical transfer function (OTF), and the MTF can be determined in various ways depending on the type of target 110 used. Target types can include slant-edge targets 110 and point-source or pin-hole targets 110. The MTF can be determined based on the type of target 110 and the camera application. In an example, the MTF is a two-dimensional Fourier transform (see FIG. 2C) of the imaging system's line spread function (LSF) taken from an edge spread function (ESF) of the slant-edge target 110.

Figure 2A:
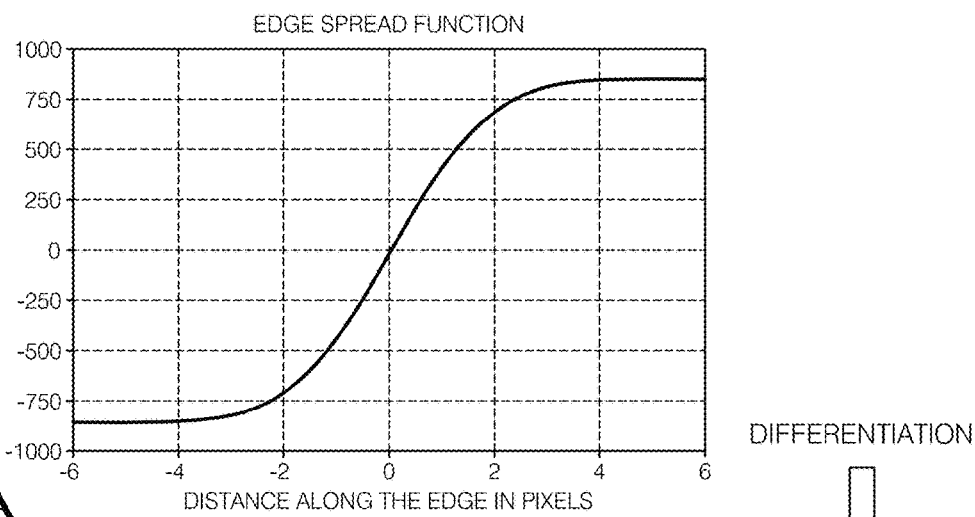
FIGS. 2A-2D illustrate example plots of an edge spread function, a line spread function, a modulation transfer function, and an example image of a slant-edge target used to develop the example plots.
Figure 2B:
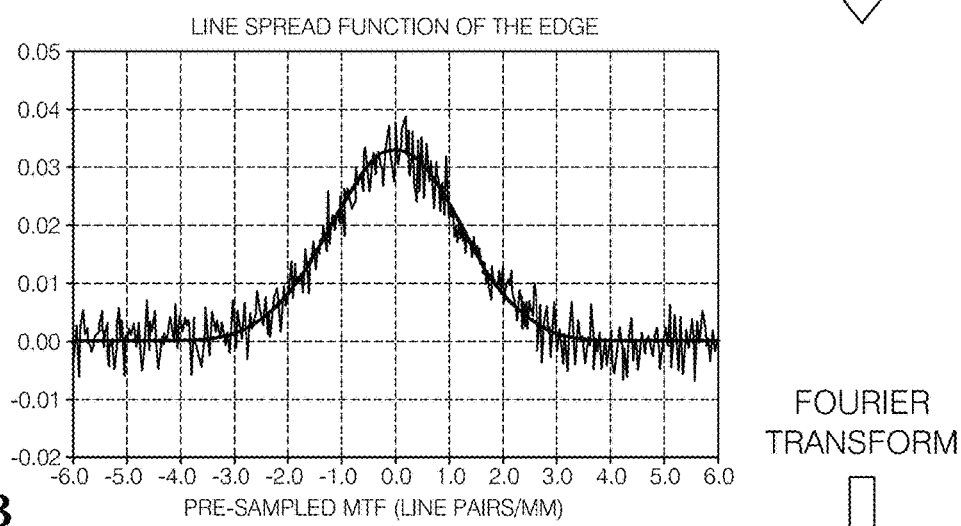
Figure 2C:
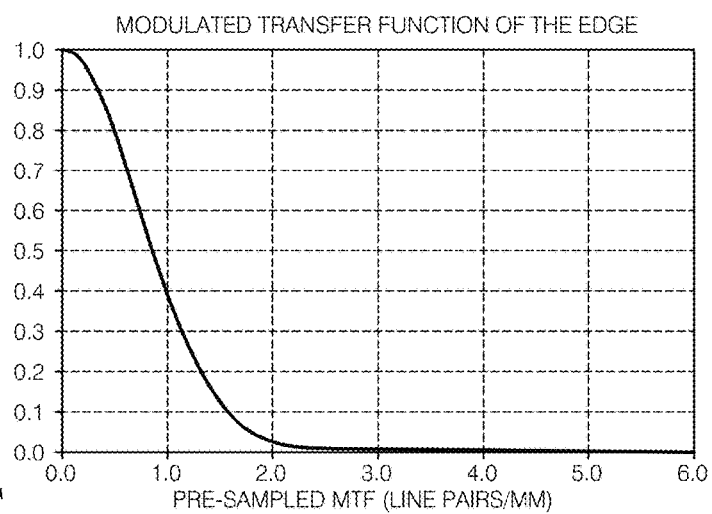
Figure 2D:
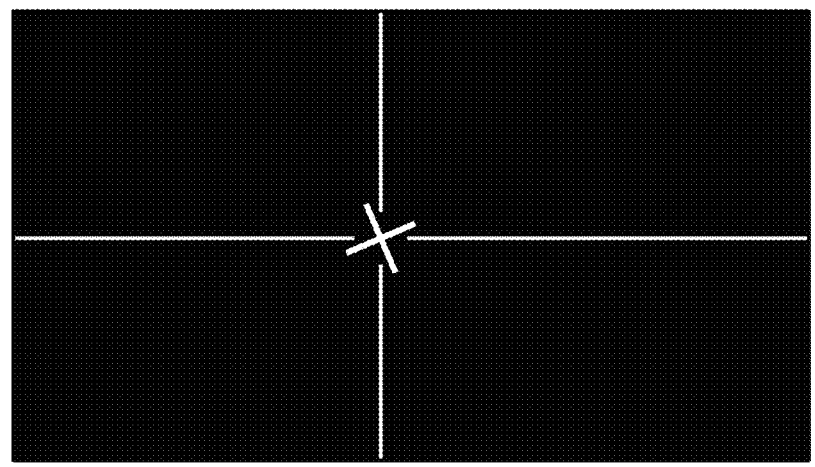

FIGS. 2A-2D illustrate example plots of an edge spread function, a line spread function, a modulation transfer function, and an example image of a slant-edge target used to develop the example plots. Slant-edge targets 110, as illustrated in FIG. 2D as the image of the slant-edge target captured by the camera 102, may be used to measure the MTF and are defined by an International Organization for Standardization (ISO) 12233 requirement for spatial resolution measurements of cameras. The LSF (see FIG. 2B) is a normalized spatial signal distribution in the linearized output of the imaging system resulting from imaging a theoretical and infinitely thin line. The ESF (see FIG. 2A) is a normalized spatial signal distribution in the linearized output of an imaging system resulting from imaging a theoretical and infinitely sharp edge. The LSF is determined by taking a first derivative of the ESF.

FIGS. 2A-2C illustrate example plots of a progression from the ESF to the MTF. An aspect of the determination of the MTF measurement is that the edges of the slant-edge target 110 being imaged by the camera 102 are oriented off-axis from horizontal and vertical axes of the camera's 102 FOV 120. That is, the edges of the target 110 are not aligned or overlaid with the horizontal and vertical reference axes of the FOV 120 so that the boundary from light to dark does not align with the rows and columns of pixels (e.g., the pixel axes) of the image sensor of the camera 102. This off-axis alignment may be achieved by rotating the target 110 relative to the FOV 120 in a range from about 5-degrees to about 20-degrees relative to the horizontal axis of the FOV 120, and in a range from about 5-degrees to about 20-degrees relative to the vertical axis of the FOV 120 (hereafter referred to as the desired off-axis measurement range). This range of rotation is needed due to the MTF measurement using two planes of focus; a sagittal plane (horizontal plane) and a tangential plane (vertical plane) that is orthogonal or normal to the sagittal plane. When the edges of the target 110 are less than about 5-degrees to the reference axes of the FOV 120 to sample the sagittal plane and/or sample the tangential plane, the Fourier transform calculation goes to infinity, and the MTF measurement cannot be made. On the other hand, when the edges of the target are greater than about 20 degrees to the horizontal and vertical reference axes, the MTF calculation may combine the horizontal plane with the vertical plane and confound the MTF measurement.

Housing

Figure 3:
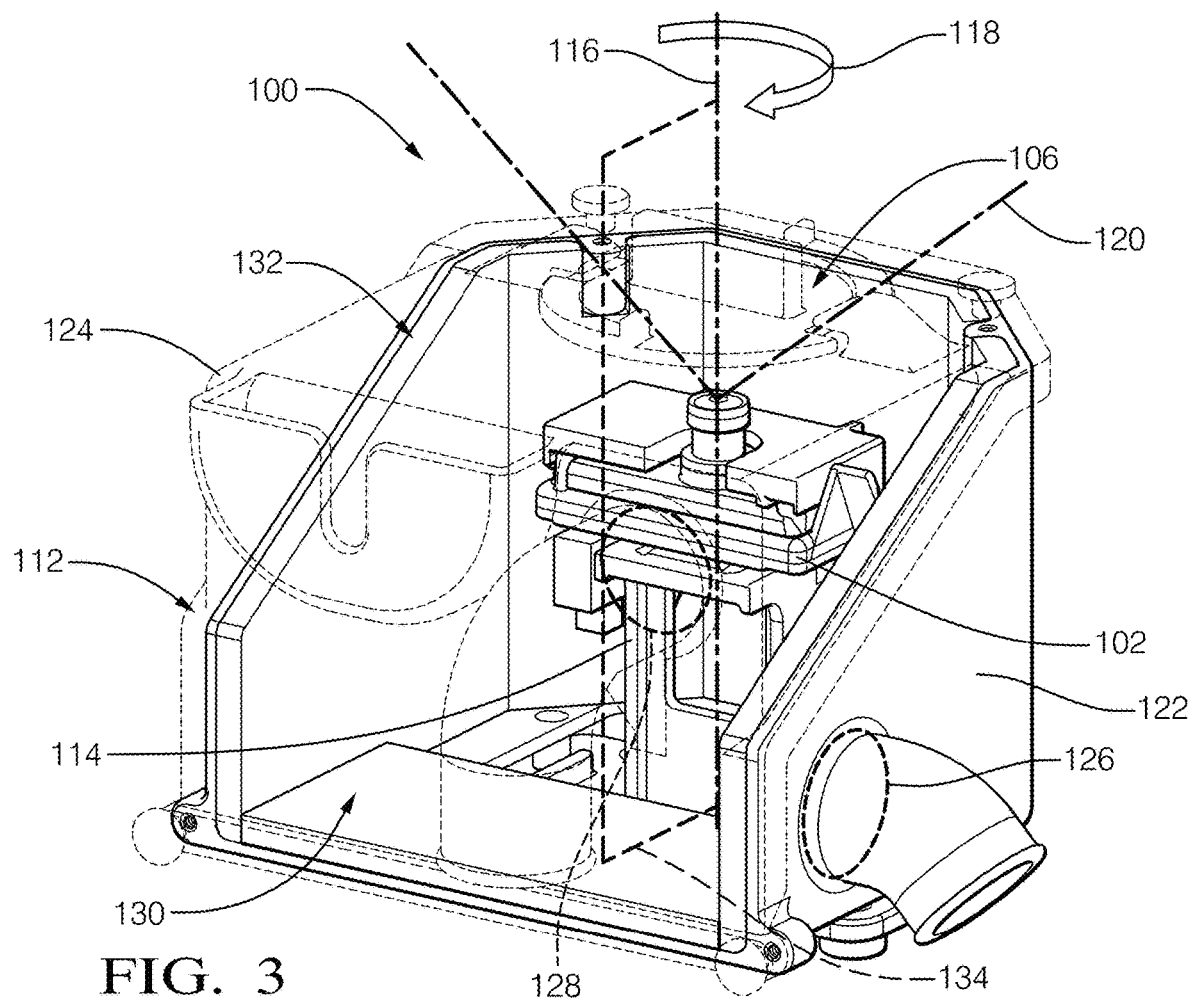
FIG. 3 illustrates the example device configured to determine an optical characteristic of a camera separated from the test stand of FIG. 1 with a portion of the device shown as a transparent layer.

FIG. 3 is a perspective view illustrating the device 100 separated from the test stand 104 where, for illustration purposes, a portion of the device 100 is shown as a transparent layer to reveal the camera 102. The device 100 includes a housing 112 configured to receive a test fixture 114 that retains the camera 102 for determining the MTF. The test fixture 114 can be mounted to the test stand 104 and can be rotated about a rotational axis through a rotation angle 118 of at least ninety degrees and up to 180 degrees. The optical axis 116 of the camera 102 defines a line of rotational symmetry of the camera 102 and can be aligned with the rotational axis of the test fixture 114 during installation of the camera 102. Aligning the optical axis 116 with the rotational axis enables the measurement of the MTF at all points in the FOV 120 of the camera 102 by rotating the camera 102 to a specific angle and moving the collimator 108 to position the target 110 at a desired point or angle in the FOV 120. The illustrations used herein show the optical axis 116 aligned with the rotational axis, and it will be understood that the line depicting the optical axis 116 also depicts the rotational axis of the test fixture 114.

The housing 112 can rotate with the test fixture 114 and camera 102 through the angle of at least 90 degrees when determining the MTF. In some examples, the test fixture 114, camera 102, and housing 112 are rotated through the rotation angle 118 of 180 degrees to test the MTF over approximately half of the FOV 120. In addition to the rotation of the test fixture 114 about the optical axis 116 of the camera 102, an objective arm on the test stand 104 that retains the collimator 108 can rotate or swing about an axis perpendicular to the optical axis 116. The combination of the rotation of the test fixture 114 and the swinging objective arm enables the entire FOV 120 of the camera 102 to be mapped for the MTF measurement.

Referring back to FIG. 3, the housing 112 includes a first segment 122, hereafter a base 122, and a second segment 124, hereafter a cover 124, removably attached to the base 122. The base 122 is configured to attach to the test fixture 114 so that a relative movement between the base 122 and the test fixture 114 is minimized, enabling the base 122 to rotate with the test fixture 114. The attachment can be made via threaded fasteners inserted through holes in a floor of the base that interface with corresponding threaded holes in the test fixture 114. The cover 124 creates a chamber into which the camera 102 is placed. For the purposes of illustrating the test fixture 114 and the camera 102, the cover 124 is shown as a transparent layer in FIG. 3. The cover 124 can be attached to the base 122 via fasteners that enable rapid attachment and detachment. The detachability of the cover 124 enables access to the chamber and is advantageous for mounting the camera 102 to the test fixture 114 or adjusting a position of the camera 102 after the base 122 has been installed onto the test stand 104.

The base 122 may define a first orifice 126 or port through one side of the base 122. The first orifice 126 is illustrated in FIG. 3 on a right side of the base 122, in other examples, the first orifice 126 is on a left side of the base 122. The first orifice 126 is positioned proximate to the floor of the base and can direct a flow of a gas out of the chamber, as will be described in more detail below.

A second orifice 128 is defined by the cover 124 and located through a first side 130 of the cover 124, hereafter a front 130 of the cover 124, to direct the flow of the gas into the chamber. The second orifice 128 is positioned proximate to a second side 132, hereafter a top 132 of the cover 124, such that the second orifice 128 and the first orifice 126 are positioned at different elevations relative to the test fixture 114.

To be clear, the rotational axis that is aligned with the optical axis 116 defines a plane 134 parallel to the inlet flow direction. The second orifice 128 and the first orifice 126 are located on a same side of the plane 134 and are shown in FIG. 3 on the right side of the housing 112. This arrangement of the second orifice 128 and the first orifice 126 enables an inlet flow direction of the gas into the chamber to be normal to an outlet flow direction of the gas out of the chamber, which enables a circulating gas flow around the camera 102, as will be explained in more detail below.

An area of the first orifice 126 is equal to the area of the second orifice 128 to minimize a pressure drop through the chamber that may occur due to restrictions in the outlet or due to header losses at the inlet. The areas of the orifices can be any area, and in the example illustrated in FIGS. 2-3, the area is approximately 5.2 square centimeters (5.2 cm$^2$) for each orifice. The areas of the orifices may also be adjusted based on a flow rate of the gas through the chamber to maintain a desired backpressure of the chamber, as the backpressure can affect the flow dynamics of the gas within the chamber.

Figure 4:
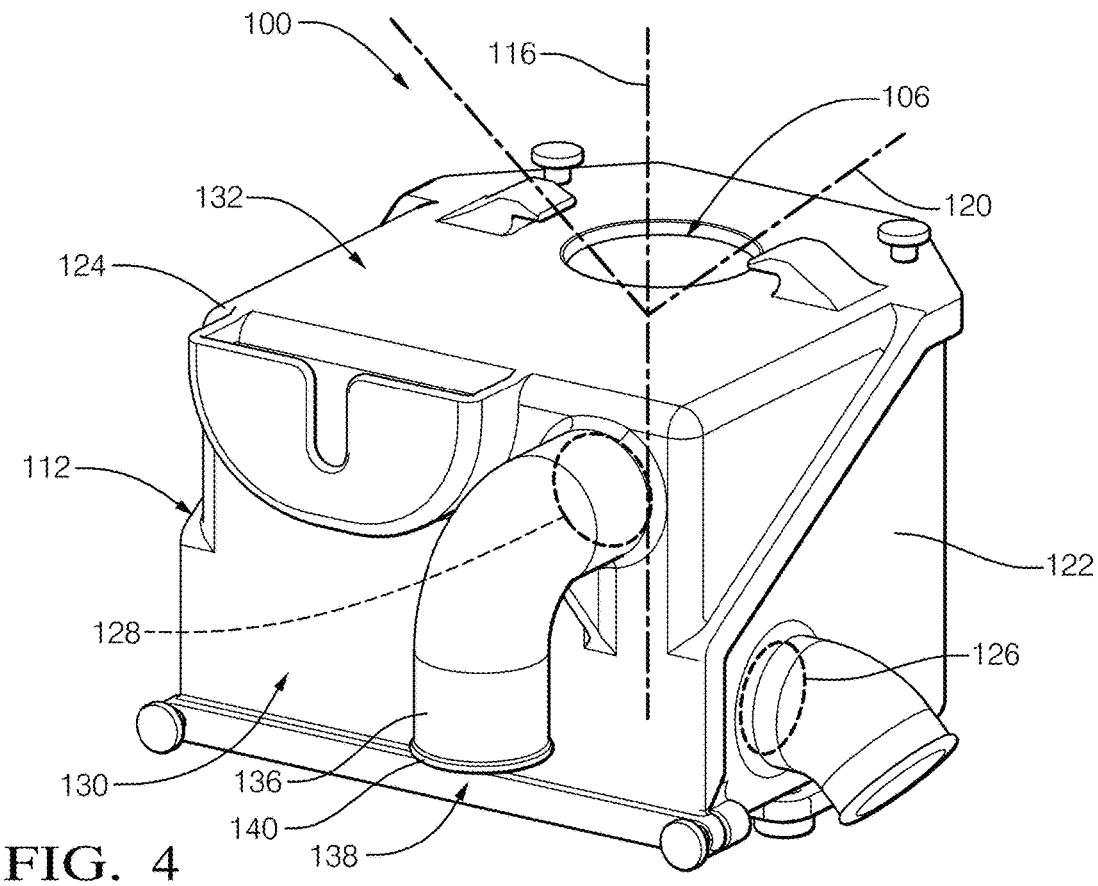
FIG. 4 illustrates the example device configured to determine an optical characteristic of a camera of FIG. 3 with a solid cover.

FIG. 4 is the same perspective view as in FIG. 3, with the cover 124 illustrated as non-transparent. A fitting 136 is attached to the cover 124 and can direct the flow of the gas through the second orifice 128 into the chamber. The fitting 136 is configured to receive the hose 111 (see FIG. 1) that delivers the gas to the device 100, which in the examples disclosed herein is air. The air can be conditioned using an air conditioning unit by heating or cooling the air to a desired temperature before the air enters the hose. The air temperature can be based on the test requirements, and the air may also be humidified.

An angle of the fitting 136 may be about 90 degrees relative to the front 130 of the cover 124, and the fitting 136 is oriented such that an inlet end 138 of the fitting 136 is facing toward a floor of the test cell. This orientation is advantageous in reducing a build-up of condensation within the fitting 136 that may otherwise occur with different orientations; the condensation will descend toward the floor of the test cell within the hose. This orientation is also beneficial for reducing a torque applied by a weight of the hose 111 to the housing 112 that can restrict the ability of the test stand 104 to rotate the housing 112 to the required angles for testing the MTF.

The fitting 136 includes a lip 140 configured to retain the hose such that the hose can rotate freely around the fitting 136 as the housing 112 is rotated about the rotational axis of the test fixture 114. The rotation of the hose relative to the fitting 136 reduces a torque on the fitting 136 that can restrict the ability of the test stand 104 to rotate the housing 112 to the required angles for testing the MTF. The hose can be retained on the fitting 136 via a hose clamp placed above the lip 140 or other retention devices, for example, corrugations in the hose can engage around the lip 140 to prevent the hose from separating from the fitting 136.

Aperture

Figure 5:
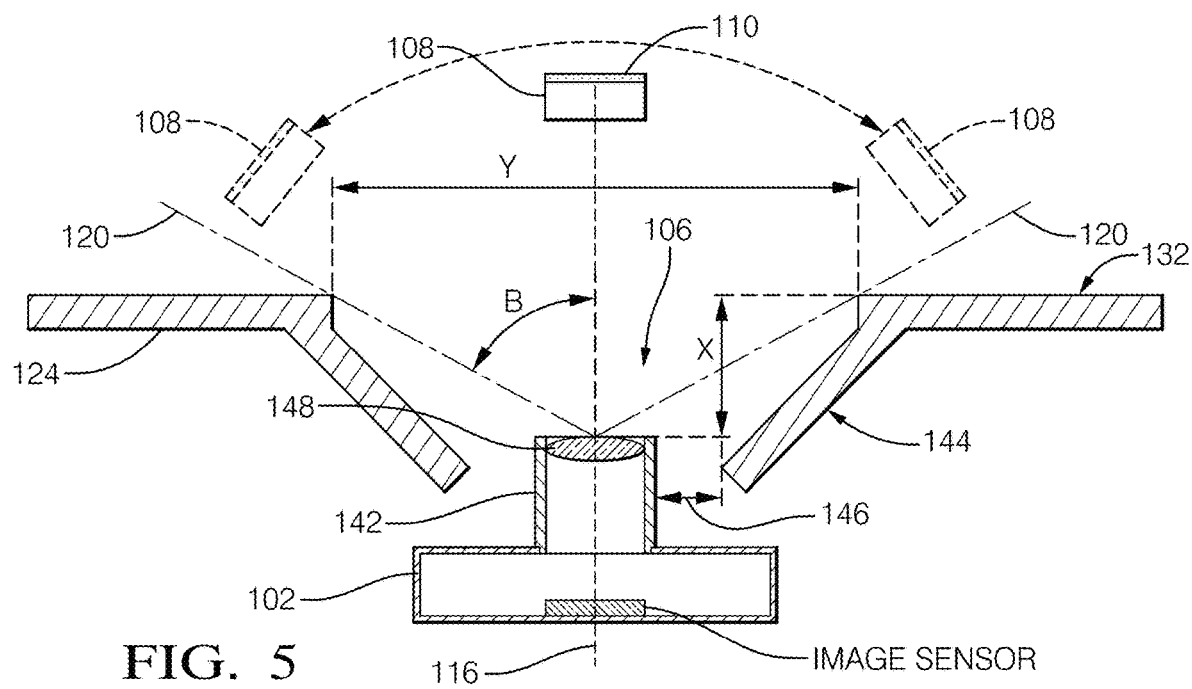
FIG. 5 is a cross-sectional view of the cover of the example device configured to determine an optical characteristic of a camera of FIG. 3, illustrating an aperture.

FIG. 5 is a cross section of the cover 124 through a center of the aperture 106. The aperture 106 is located in the top 132 of the cover 124 and is positioned opposite the test fixture 114 to define the FOV 120 that includes the camera target 110 in the collimator 108. The test stand 104 can move or rotate the collimator 108 through an arc so that the target 110 can be placed at different points or angles in the FOV 120. The aperture 106 is sized, shaped, and arranged to receive a lens barrel 142 of the camera 102 enabling the determination of the MTF, and in the examples illustrated in FIG. 5, the FOV 120 is in a range of about 50 degrees to about 120 degrees.

The aperture 106 is further defined by a conical section 144 attached to the cover 124 that protrudes or extends into the chamber toward the test fixture 114 and camera 102. The conical section 144 may be formed integral to the cover 124 or may be attached as a separate component of the cover 124. The conical section 144 defines an annulus 146 or open ring between the lens barrel 142 and a leading edge of the conical section providing a clearance between the lens barrel 142 and the conical section 144. In the example illustrated in FIG. 5, the annulus 146 is in a range from about one millimeter (1.0 mm) to about 15 mm and can vary based on a diameter of the lens barrel 142. Minimizing the annulus 146 is advantageous for maintaining the temperature within the chamber and reducing a flow of air from the chamber through the annulus 146 that may create optical aberrations during the MTF measurements. Optimizing a size of the annulus 146 to enable a relatively small air flow rate through the annulus 146 may be advantageous to reduce fogging of the camera lens that may be caused by humidity in the surrounding room air.

Dimensions of the aperture 106 and a distance, X, of a camera lens 148 to the top 132 of the cover 124 can be determined based on the angle of the FOV 120. For example, the diameter of the aperture 106 in the top 132 of the cover 124, shown as parameter Y in FIG. 5, can be determined by the equation, Y=2*X*tan(B), where X is the distance from the top 132 of the cover 124 to a vertex or highest point of the camera lens, and B is a half-angle of the FOV 120. Knowing the FOV 120 of the camera 102 being tested, the user may fabricate or select the cover 124 with the appropriate diameter, Y, of the annulus 146 so that the cover 124 does not occlude the FOV 120 during measurement of the MTF. In the scenario where the diameter, Y, and the FOV 120 are predetermined, the distance, X, can be solved by rearranging the equation. For example, given Y=45 mm and B=50 degrees, X=18.8 mm. In this example, the apex of the camera lens 148 cannot exceed a depth of 18.8 mm below the top 132 of the cover 124 to maintain a clear or unoccluded FOV 120.

Insulation

Figure 6:
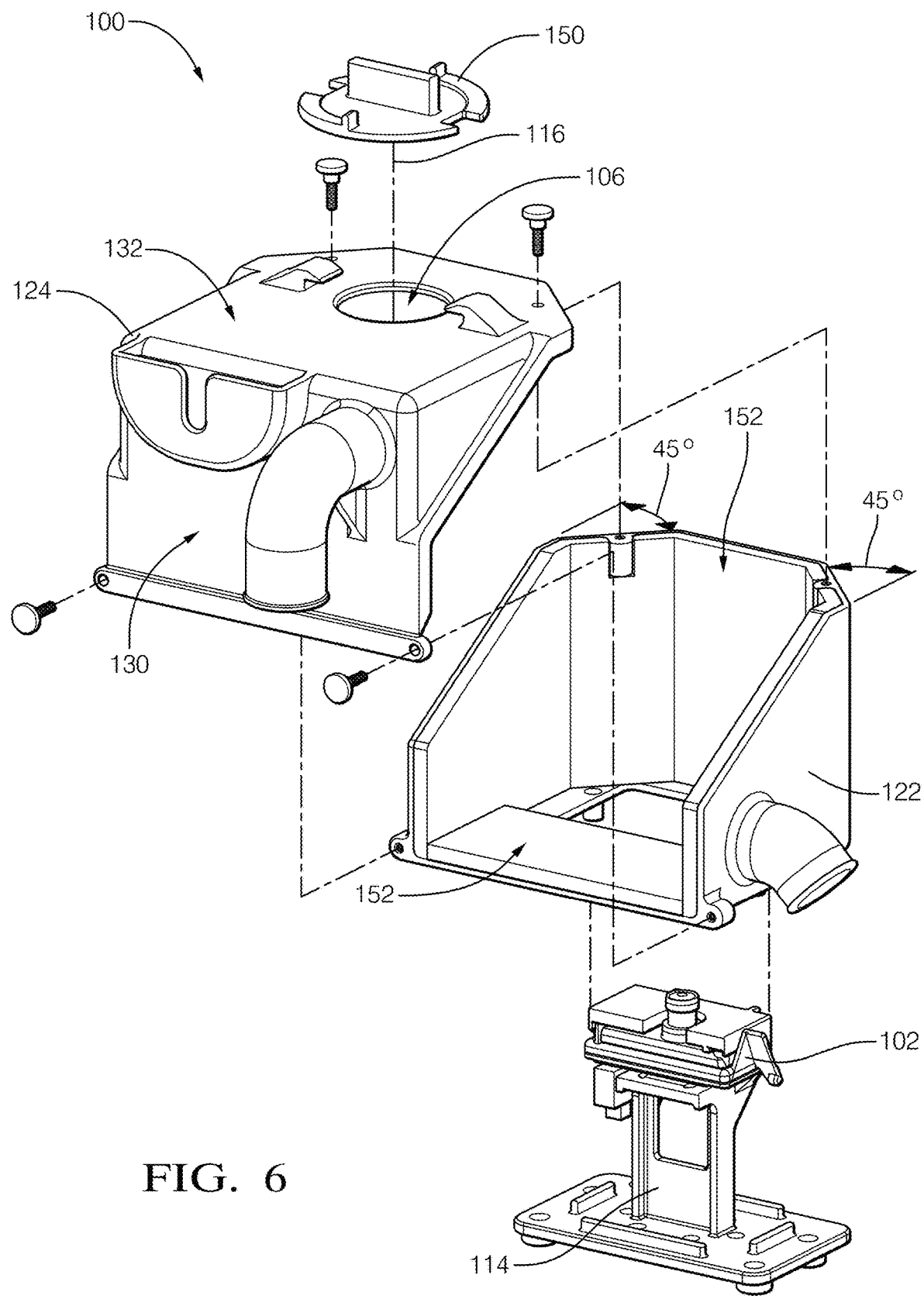
FIG. 6 is an exploded view of the example device configured to determine an optical characteristic of a camera of FIG. 3 separated from the test stand.

FIG. 6 is an exploded view of the device 100 showing the camera 102 mounted to the test fixture 114. A cap 150 or plug can be used to seal the aperture 106 to inhibit thermal losses while the camera 102 is being held at the test temperature set-point, then removed to measure the MTF. The cap 150 can include a skirt that inserts into the aperture 106 or can have a flat surface that seals against the top 132 of the cover 124. The skirt can have a clearance fit with vertical sides of the aperture 106, and the cap can include opposing ramped sections that engage corresponding opposing mounting lugs formed into the top 132 of the cover 124, as illustrated in FIG. 6. The cap 150 can be rotated about the optical axis 116 to engage the ramped sections with the mounting lugs to seal the aperture 106.

The base 122 and cover 124 can include insulation layers 152 attached to internal or external surfaces, and in the example illustrated in FIG. 6, the insulation layers 152 line the internal surfaces of both the base 122 and cover 124 (not shown). In this example, the insulation layers have a thickness of approximately 6 mm and have an R-value, or a capacity of the insulating material to resist heat flow, in the range of R=4 to R=5. As the R-value increases, the insulating ability of the material also increases.

The base 122 and cover 124 can be formed of a polymer material, for example, Acrylonitrile butadiene styrene (ABS), nylon, or polyetherimide that is marketed under the name of ULTEM®, manufactured by SABIC, Riyadh, Saudi Arabia. The material can be selected based on the temperature range determined by the testing requirements. The base 122 and cover 124 can be injection molded or fabricated via additive manufacturing or 3D-printing, and in the example illustrated in FIG. 6, the base 122 and cover 124 are 3D-printed from ABS, resulting in the fitting 135, the aperture 106, and the mounting lugs, being integrally formed with the cover 124.

Air Flow

Walls of the housing 112 are configured to circulate the flow of air around the camera 102 before exiting the chamber, and at least two sides or walls of the base 122 are arranged at 45-degree angles relative to the inlet flow direction, as illustrated in FIG. 6. The placement of the walls having the 45-degree angles also provides clearance between the device 100 and the test stand 104, enabling the housing 112 to be rotated without interference from the test stand 104.

Figure 7A:
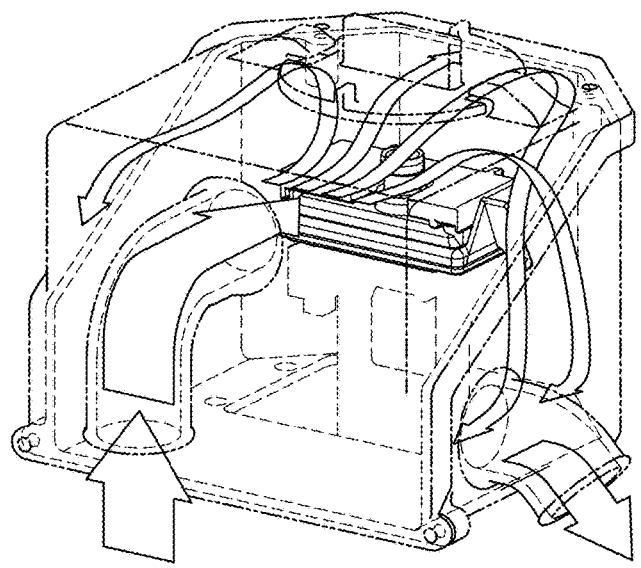
FIGS. 7A-7C illustrate examples of air flow within the example device configured to determine an optical characteristic of a camera of FIG. 3.
Figure 7B:
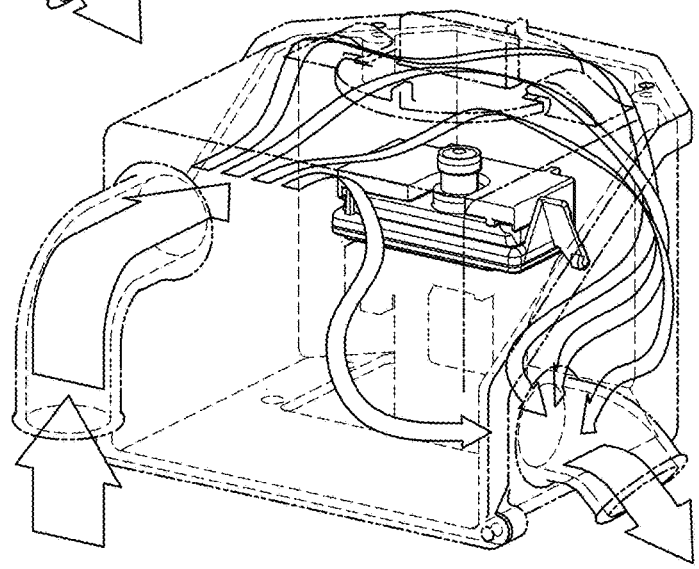
Figure 7C:
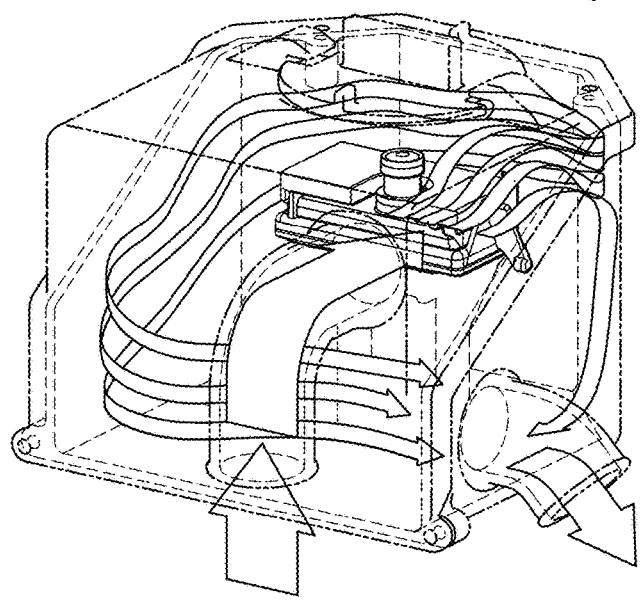

FIGS. 7A-7C illustrate flow modeling of three different positions of the first orifice 126 in the cover 124. FIG. 7A shows the flow dynamics with the first orifice 126 centered on the front 130 of the cover 124. This placement enables the air flow to directly impinge on the camera 102 before exiting the chamber at the second orifice 128 on the lower-right side of the device 100. This placement of the first orifice 126 results in erratic flow patterns within the chamber and can also create aberrations in the MTF measurements.

FIG. 7B shows the flow dynamics with the first orifice 126 located on a left side of the front 130 of the cover 124. This placement directs the air flow to pass around a back side of the camera 102 before exiting the chamber. This placement improves the flow efficiency and a heat transfer from the air to the camera 102 compared to the central placement shown in FIG. 7A. Efficiencies in the heat transfer can be determined based on the time to reach a temperature set-point, with higher efficiencies resulting in shorter times to the set-point.

FIG. 7C shows the flow dynamics with the first orifice 126 located on a right side of the front 130 of the cover 124, as illustrated in FIGS. 1-3. This placement directs the air flow to circulate around the back side of the camera 102 and then around a front side of the camera 102 before exiting the chamber. This placement results in improved air circulation and improved heat transfer from the air to the camera 102 compared to the placement in FIGS. 7A and 7B.

Example Test System

Figure 8:
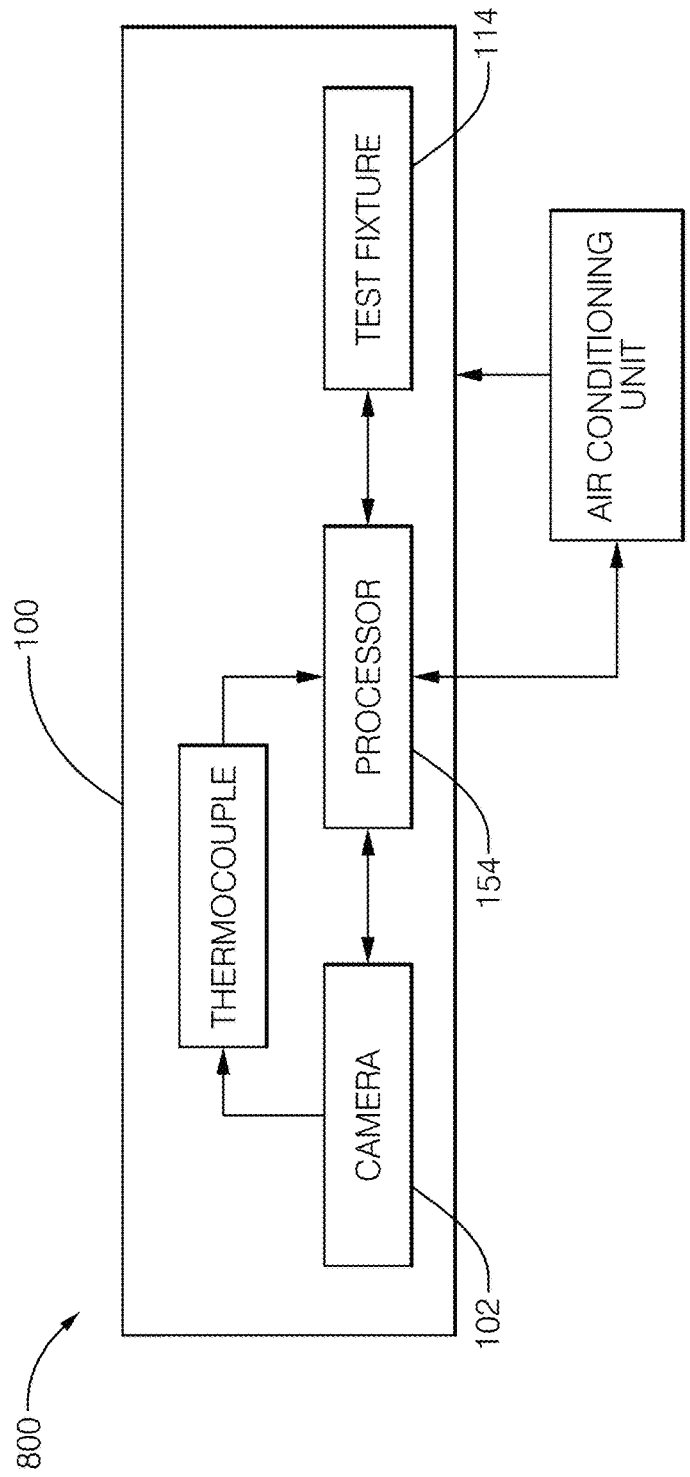
FIG. 8 is an example system containing the example device configured to determine an optical characteristic of a camera of FIG. 3.

FIG. 8 illustrates a test system 800 to determine the MTF, where the device 100 further includes a processor 154 or controller in communication with the test fixture 114 and the camera 102. The processor 154 can be attached to the housing 112 or can be located remotely from the housing 112. The processor 154 may be implemented as a microprocessor or other control circuitry such as analog and/or digital control circuitry. The control circuitry may include one or more application-specific integrated circuits (ASICs) or field-programmable gate arrays (FPGAs) that are programmed to perform the techniques or may include one or more general-purpose hardware processors programmed to perform the techniques in accordance with program instructions in firmware, memory, other storage, or a combination thereof. The processor 154 may also combine custom hard-wired logic, ASICs, or FPGAs with custom programming to accomplish the techniques. The processor 154 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying programming signals. The processor 154 may include other examples of non-volatile memory, such as flash memory, read-only memory (ROM), programmable read-only memory (PROM), and erasable programmable read-only memory (EPROM). The processor 154 may include volatile memory, such as dynamic random-access memory (DRAM) or static random-access memory (SRAM). The one or more routines may be executed by the processor to perform steps for determining the MTF based on signals received by the processor 154 from the camera 102 and the test fixture 114 as described herein.

The processor 154 can adjust the rotation angle 118 of the test fixture 114 about the optical axis 116 of the camera 102 to position the camera 102 for measuring the MTF at all points in the FOV 120. The processor 154 can send signals to motors or rotary actuators in the test stand 104 that control the rotation of the test fixture 114 retaining the camera 102. The processor 154 can also send signals to the test stand 104 to position the target 110 in a plane that is normal to lines of sight of the camera 102 at any position within the FOV 120 by swinging the objective arm that retains the collimator 108, as illustrated in FIG. 5. For example, the target 110 can be positioned by the test stand 104 by swinging the objective arm such that the target 110 is perpendicular to any line of sight. Positioning the target 110 normal to the line of sight reduces errors in the measurement of the MTF because the target 110 is most accurately sampled by measuring the target 110 normal to a field angle radius or line of sight. The test stand 104 is configured to position a center of the target 110 at a same radial distance from the camera 102 at all positions in the FOV 120 by moving the target 110 along an arc from one position to the next with the radius of the arc remaining constant.

The processor 154 can receive image data from the camera 102 representing captured images of the camera target 110 in the FOV 120 of the camera 102 and adjust the position of the target 110 in the FOV 120. The processor 154 can determine the MTF of the camera 102 based on the camera target 110 at the adjusted positions in the FOV 120 when a temperature of the camera is at a camera-temperature set point. The camera temperature can be determined by one or more thermocouples attached to the camera 102 that may be shielded from the air flow impinging on the thermocouple. The thermocouples may be located in a space between the camera 102 and the test fixture 114, where the air flow is minimized. Additional thermocouples can be placed in the chamber as a reference for determining the air temperature entering the device 100.

The processor 154 can determine the MTF at room temperature after the camera 102 is installed on the test fixture 114 at all points in the FOV 120. The processor can then determine the MTF after the camera 102 has reached the set-point temperature of 85° C. and soaks or holds at the set-point temperature for a period of at least ten minutes to ensure the camera temperature is stable. The cap 150 can be installed on the cover 124 to retain heat within the housing 112 as the temperature of the camera is adjusted, then removed for the MTF measurements. Removing the cap 150 can result in a relatively small temperature drop, for example, in a range of 1° C. to 2° C., and is enabled by the insulative properties of the housing 112 and the geometry of the aperture 106 that minimizes flow out of the aperture 106. A ramp rate from room temperature to the set-point temperature of 85° C. can occur in the range of 15 minutes to 20 minutes and is enabled by the insulative properties of the housing 112. The air conditioning unit can be set to a higher temperature than the camera temperature set-point, for example, 15° C. to 20° C. above the set-point temperature, to overcome heat losses in the system 800.

The processor 154 can then determine the MTF at all points in the FOV 120 when the camera has reached the camera-temperature set point of −40° C., and after the camera 102 soaks at this set-point temperature for at least ten minutes. The ramp rate from 85° C. to the set-point temperature of −40° C. can be in the range of 30 minutes to 40 minutes, and the air conditioning unit can be set to a lower temperature than the camera temperature set-point, for example, 15° C. to 20° C. below the set-point temperature, to overcome heat gains in the system 800.

The air conditioning unit can be manually controlled to achieve the desired camera set-point temperatures or can be controlled by the processor 154. The air flow rate delivered by the air conditioning unit can be in a range of about 10 meters per second (10 m/s) and can vary based on the testing requirements and desired temperature ramp rates.

Example Process Flows

Figure 9:
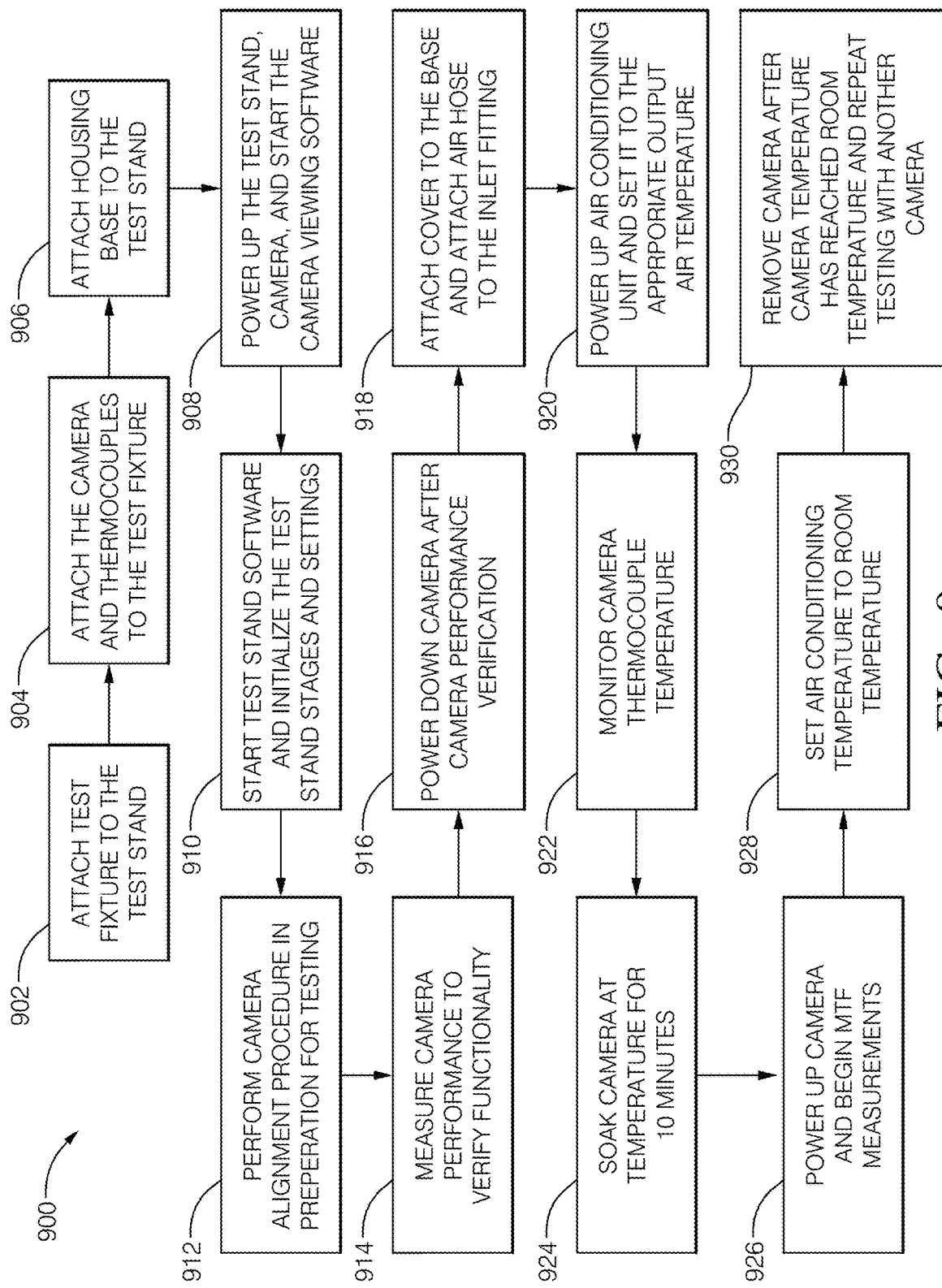
FIG. 9 is a flow chart illustrating an example process flow for determining an optical characteristic of a camera.

FIG. 9 is an example of an overall process flow 900 starting at 902 with attaching the test fixture 114 to the test stand 104 and ending at 930 with repeating the MTF measurements on other cameras 102. In this example, at 902, the test fixture 114 is attached to the test stand 104. At 904, the camera 102 and thermocouples are attached to the test fixture 114. A wiring harness connects the camera 102 and thermocouples to the processor 154. At 906, the base 122 of the housing 112 is placed over the test fixture 114 and camera 102 and is attached to the test fixture 114 using fasteners.

At 908, the test stand 104 and the camera 102 are powered up and the camera viewing software used to measure the MTF is launched. At 910, software used to operate the test stand is launched and test settings for the MTF testing are initialized.

At 912, the optical axis 116 of the camera 102 is aligned with the rotational axis of the test stand 104, and at 914, the performance of the camera 102 is measured to verify functionality of the camera 102 and the system 800 before closing the housing 112.

At 916, the camera 102 is powered off, and at 918, the cover 124 is attached to the base 122 of the housing 112 and the air hose is installed on the fitting 136.

At 920, the air conditioning unit is powered on and set to the first temperature set-point. At 922, the camera thermocouple temperature is monitored, and when the thermocouple has reached the temperature set-point, at 924, the camera 102 is soaked at the temperature set-point for 10 minutes.

At 926, the camera 102 is powered on and the MTF measurements are conducted at all points in the FOV 120, as determined by the test specification. The camera can be rotated about the optical axis 116 through 90 degrees to 180 degrees, and the target 110 can be moved across the entire FOV 120 to capture all the images at the specified test points.

Once the MTF measurements are completed, at 928, the air conditioning unit is set to room temperature, and once the temperature of the camera 102 has reached room temperature, at 930, the cover 124 and camera 102 are removed, and the testing is repeated with another camera 102.

Example Method

Figure 10:
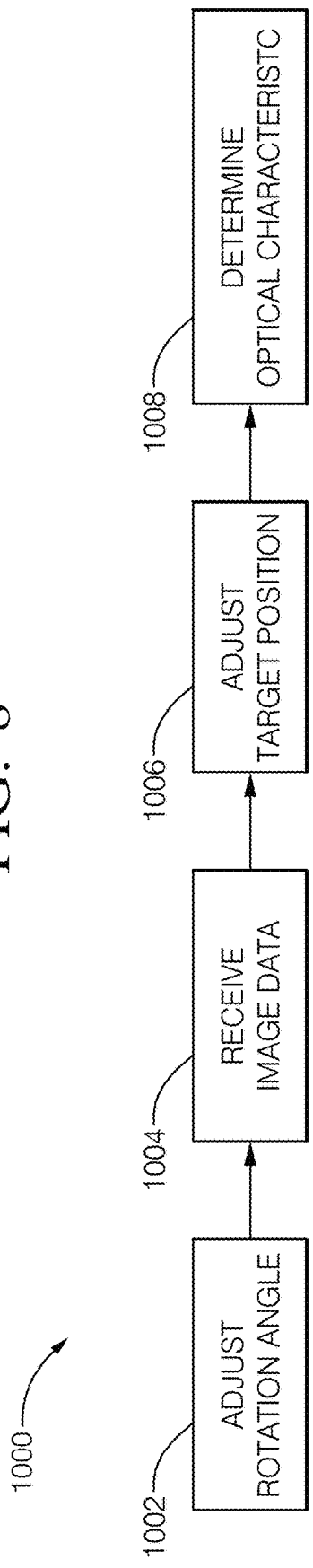
FIG. 10 illustrates an example method of determining an optical characteristic of a camera.

FIG. 10 illustrates example methods 900 performed by the system 800. For example, the processor 154 configures the system 800 to perform operations 902 through 908 by executing instructions associated with the processor 154. The operations (or steps) 902 through 908 are performed but not necessarily limited to the order or combinations in which the operations are shown herein. Further, any of one or more of the operations may be repeated, combined, or reorganized to provide other operations.

Step 1002 includes ADJUST ROTATION ANGLE. This can include adjusting, with the processor 154, the rotation angle 118 of the test fixture 114 about the optical axis 116 of the camera 102 retained by the test fixture 114, as described above. The camera 102 is placed within the insulated housing 112 that includes the cover 124 removably attached to the base 122. The base 122 is attached to the test fixture 114, enabling the housing 112 to rotate with the test fixture 114 through the rotation angle 118 of at least 90 degrees and up to 180 degrees, as described above. The processor 154 adjusts the rotation angle 118 so that the MTF of the camera 102 can be measured at all points in the FOV 120 of the camera, as described above.

The housing 112 includes the first orifice 126 that directs the flow of conditioned air out of the housing 112 and the second orifice 128 that directs the conditioned air into the housing 112. The inlet air flow direction is normal to the outlet air flow direction, and the orifices are arranged so that the air circulates around the camera 102 before exiting the housing 112, as described above. The cover 124 includes the aperture 106 that is positioned opposite the test fixture 114 and camera 102 and defines the FOV 120 that includes the target 110 used for determining the MTF of the camera 102. The aperture 106 is sized to receive the lens barrel 142 of the camera 102, and the geometry of the aperture 106 reduces the flow of air out of the housing 112 from around the lens barrel 142 during testing, as described above.

Step 1004 includes RECEIVE IMAGE DATA. This can include receiving, with the processor 154, image data from the camera 102 representing the captured image of the camera target 110 in the FOV 120 of the camera 102, as described above. The camera 102 can capture images of the target 110 at different magnifications of the collimator that represents target distances from 1 meter to infinity, as described above. The images can be stored in the memory of the processor 154 for determining the MTF. The target 110 can be the slant-edge target 110 or pin-hole target 110 that is back-lit to improve the sharpness of the image captured by the camera 102.

Step 1006 includes ADJUST TARGET POSITION. This can include adjusting, with the processor 154, the position of the camera target 110 in the FOV 120 of the camera 102. The processor 154 can send signals to the test stand 104 to move the collimator 108, retaining the target 110 through an arc to different points in the FOV 120. The test stand 104 positions the center of the target 110 at the same radial distance from the camera 102 at all positions in the FOV 120 when moving the target 110 along the arc from one position to the next by maintaining a constant arc radius, as described above. The position of the target 110 can be adjusted in any increments, for example, in increments of 1 degree across the range of the FOV 120.

Step 1008 includes DETERMINE OPTICAL CHARACTERISTIC. This can include determining the optical characteristic of the camera or the MTF based on the camera target 110 when a temperature of the camera 102 is at the camera-temperature set point, as described above. The MTF can be determined over a temperature range of −40° C. to 85° C., and in some applications up to temperatures of 125° C. The temperature of the camera 102 is held or soaked at each temperature set-point for at least ten minutes before measuring the MTF to ensure a stable camera temperature. The time to ramp the camera-temperature set point from room temperature to −40° C. or from room temperature to 85° C. is about fifteen minutes to about twenty minutes, and the time to adjust the camera-temperature set point from −40° C. to 85° C., or from 85° C. to −40° C., is about thirty minutes to forty minutes. The processor 154 uses known software for determining the MTF based on the type of target 110 retained in the collimator 108.

EXAMPLES

In the following section, examples are provided.

Example 1. A device comprising: a housing configured to receive a test fixture that retains a camera for determining an optical characteristic of the camera, the housing comprising: a first segment and a second segment removably attached to the first segment thereby creating a chamber into which the camera is disposed, the first segment being configured to attach to the test fixture and defining a first orifice located in a side of the first segment, the first orifice being configured to direct a flow of a gas out of the chamber, an inlet flow direction of the gas into the chamber being normal to an outlet flow direction of the gas out of the chamber, the second segment defining: a second orifice located in a first side of the second segment to direct the flow of the gas into the chamber; and an aperture located in a second side of the second segment, the aperture: positioned opposite the test fixture to define a field of view that includes a camera target; and configured to receive a lens barrel of the camera thereby enabling the determination of the optical characteristic.

Example 2. The device of the previous example, wherein a fitting is attached to the second segment being configured to direct the flow of the gas through the second orifice, and wherein an angle of the fitting is about 90 degrees relative to the first side.

Example 3. The device of any of the previous examples, wherein the fitting comprises a lip configured to rotatably retain a hose being configured to deliver the gas to the fitting.

Example 4. The device of any of the previous examples, wherein an area of the first orifice is equal to the area of the second orifice.

Example 5. The device of any of the previous examples, wherein at least two sides of the first segment are arranged at 45-degree angles relative to the inlet flow direction.

Example 6. The device of any of the previous examples, wherein walls of the housing are configured to circulate the flow of the gas around the camera before exiting the chamber.

Example 7. The device of any of the previous examples, wherein an optical axis of the camera defines a rotational axis of the test fixture, and wherein the housing is configured to rotate with the test fixture through an angle of at least ninety degrees.

Example 8. The device of any of the previous examples, wherein the rotational axis defines a plane parallel to the inlet flow direction and wherein the second orifice and the first orifice are located on a same side of the plane.

Example 9. The device of any of the previous examples, wherein the second orifice and the first orifice are positioned at different elevations relative to the test fixture.

Example 10. The device of any of the previous examples, wherein the first segment and the second segment comprise insulation layers attached to one or more of internal and external surfaces.

Example 11. The device of any of the previous examples, wherein the field of view is in a range of about fifty degrees to about 120 degrees.

Example 12. The device of any of the previous examples, wherein the aperture is further defined by a conical section attached to the second segment that protrudes into the chamber toward the test fixture, the conical section defining an annulus between the lens barrel and a leading edge of the conical section.

Example 13. The device of any of the previous examples, wherein the annulus is in a range from about one millimeter to about fifteen millimeters.

Example 14. The device of any of the previous examples, wherein the optical characteristic of the camera is a modulation transfer function (MTF).

Example 15. The device of any of the previous examples, wherein the device further includes a processor in communication with the test fixture and the camera, the processor configured to: adjust a rotation angle of the test fixture about an optical axis of the camera; receive image data from the camera representing a captured image of the camera target in the field of view of the camera; adjust a position of the camera target in the field of view of the camera; and determine the optical characteristic of the camera based on the camera target when a temperature of the camera is at a camera-temperature set point.

Example 16. The device of any of the previous examples, wherein the processor is further configured to determine the optical characteristic when the camera-temperature set point is in a range from −40 degrees Celsius to 85 degrees Celsius.

Example 17. A method comprising: adjusting, with a processor, a rotation angle of a test fixture about an optical axis of a camera retained by the test fixture being disposed within a housing, the housing comprising a first segment and a second segment removably attached to the first segment thereby creating a chamber; the first segment being configured to attach to the test fixture and defining a first orifice located in a side of the first segment the first orifice being configured to direct a flow of a gas out of the chamber, the second segment defining: a second orifice located in a first side of the second segment to direct the flow of the gas into the chamber; and an aperture located in a second side of the second segment, the aperture: positioned opposite the test fixture to define a field of view that includes a camera target; and configured to receive a lens barrel of the camera thereby enabling a determination of an optical characteristic of the camera; receiving image data from the camera representing a captured image of the camera target in the field of view of the camera; adjusting a position of the camera target in the field of view of the camera; and determining the optical characteristic of the camera based on the camera target when a temperature of the camera is at a camera-temperature set point.

Example 18. The method of the previous example, further comprising determining the optical characteristic, with the processor, when the camera-temperature set point is in a range from −40 degrees Celsius to 85 degrees Celsius.

Example 19. The method of any of the previous examples, further comprising adjusting the camera-temperature set point from room temperature to −40 degrees Celsius or from room temperature to 85 degrees Celsius in a time of about fifteen minutes to about twenty minutes.

Example 20. The method of any of the previous examples, further comprising holding the temperature of the camera at the camera-temperature set point for a period of at least ten minutes.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A device comprising:
 a housing configured to receive a test fixture that retains a camera for determining an optical characteristic of the camera, the housing comprising:
  a first segment and a second segment removably attached to the first segment, thereby creating a chamber into which the camera is disposed,
  the first segment being configured to attach to the test fixture and defining a first orifice located in a side of the first segment,
  the first orifice being configured to direct a flow of a gas out of the chamber, an inlet flow direction of the gas into the chamber being normal to an outlet flow direction of the gas out of the chamber,
  the second segment defining:
   a second orifice located in a first side of the second segment to direct the flow of the gas into the chamber; and
   an aperture located in a second side of the second segment, the aperture:

positioned opposite the test fixture to define a field of view that includes a camera target; and configured to receive a lens barrel of the camera, thereby enabling the determination of the optical characteristic.

2. The device of claim 1, wherein a fitting is attached to the second segment being configured to direct the flow of the gas through the second orifice, and wherein an angle of the fitting is about 90 degrees relative to the first side.

3. The device of claim 2, wherein the fitting comprises a lip configured to rotatably retain a hose being configured to deliver the gas to the fitting.

4. The device of claim 1, wherein an area of the first orifice is equal to the area of the second orifice.

5. The device of claim 1, wherein at least two sides of the first segment are arranged at 45-degree angles relative to the inlet flow direction.

6. The device of claim 1, wherein walls of the housing are configured to circulate the flow of the gas around the camera before exiting the chamber.

7. The device of claim 1, wherein an optical axis of the camera defines a rotational axis of the test fixture, and wherein the housing is configured to rotate with the test fixture through an angle of at least ninety degrees.

8. The device of claim 7, wherein the rotational axis defines a plane parallel to the inlet flow direction, and wherein the second orifice and the first orifice are located on a same side of the plane.

9. The device of claim 8, wherein the second orifice and the first orifice are positioned at different elevations relative to the test fixture.

10. The device of claim 1, wherein the first segment and the second segment comprise insulation layers attached to one or more of internal and external surfaces.

11. The device of claim 1, wherein the field of view is in a range of about fifty degrees to about 120 degrees.

12. The device of claim 1, wherein the aperture is further defined by a conical section attached to the second segment that protrudes into the chamber toward the test fixture, the conical section defining an annulus between the lens barrel and a leading edge of the conical section.

13. The device of claim 12, wherein the annulus is in a range from about one millimeter to about fifteen millimeters.

14. The device of claim 1, wherein the optical characteristic of the camera is a modulation transfer function (MTF).

15. The device of claim 1, wherein the device further includes a processor in communication with the test fixture and the camera, the processor configured to:

adjust a rotation angle of the test fixture about an optical axis of the camera;

receive image data from the camera representing a captured image of the camera target in the field of view of the camera;

adjust a position of the camera target in the field of view of the camera; and determine the optical characteristic of the camera based on the camera target when a temperature of the camera is at a camera-temperature set point.

16. The device of claim 15, wherein the processor is further configured to determine the optical characteristic when the camera-temperature set point is in a range from −40 degrees Celsius to 85 degrees Celsius.

17. A method comprising:

adjusting, with a processor, a rotation angle of a test fixture about an optical axis of a camera retained by the test fixture being disposed within a housing, the housing comprising a first segment and a second segment removably attached to the first segment, thereby creating a chamber;

the first segment being configured to attach to the test fixture and defining a first orifice located in a side of the first segment the first orifice being configured to direct a flow of a gas out of the chamber, the second segment defining:

a second orifice located in a first side of the second segment to direct the flow of the gas into the chamber; and an aperture located in a second side of the second segment, the aperture:

positioned opposite the test fixture to define a field of view that includes a camera target; and configured to receive a lens barrel of the camera, thereby enabling a determination of an optical characteristic of the camera;

receiving image data from the camera representing a captured image of the camera target in the field of view of the camera;

adjusting a position of the camera target in the field of view of the camera; and determining the optical characteristic of the camera based on the camera target when a temperature of the camera is at a camera-temperature set point.

18. The method of claim 17, further comprising determining the optical characteristic, with the processor, when the camera-temperature set point is in a range from −40 degrees Celsius to 85 degrees Celsius.

19. The method of claim 18, further comprising adjusting the camera-temperature set point from room temperature to −40 degrees Celsius or from room temperature to 85 degrees Celsius in a time of about fifteen minutes to about twenty minutes.

20. The method of claim 19, further comprising holding the temperature of the camera at the camera-temperature set point for a period of at least ten minutes.

* * * * *